(12) United States Patent
Hiraishi

(10) Patent No.: US 11,390,121 B2
(45) Date of Patent: Jul. 19, 2022

(54) TIRE

(71) Applicant: Bridgestone Corporation, Tokyo (JP)

(72) Inventor: Tomohiro Hiraishi, Tokyo (JP)

(73) Assignee: Bridgestone Corporation, Tokyo (JP)

(*) Notice: Subject to any disclaimer, the term of this patent is extended or adjusted under 35 U.S.C. 154(b) by 255 days.

(21) Appl. No.: 16/712,595

(22) Filed: Dec. 12, 2019

(65) Prior Publication Data

US 2020/0114694 A1 Apr. 16, 2020

Related U.S. Application Data

(63) Continuation of application No. PCT/JP2018/018980, filed on May 16, 2018.

(30) Foreign Application Priority Data

Jun. 15, 2017 (JP) .............................. JP2017-118139

(51) Int. Cl.
*B60C 11/00* (2006.01)
*B60C 11/03* (2006.01)
*B60C 1/00* (2006.01)

(52) U.S. Cl.
CPC ........ *B60C 11/0309* (2013.01); *B60C 1/0016* (2013.01); *B60C 2011/0025* (2013.01);
(Continued)

(58) Field of Classification Search
CPC .............. B60C 11/0309; B60C 1/0016; B60C 2011/0025; B60C 2011/0344; B60C 2011/0355; B60C 11/03; B60C 11/00
See application file for complete search history.

(56) References Cited

U.S. PATENT DOCUMENTS

| 10,220,655 B2 | 3/2019 | Satoi |
| 2009/0008011 A1 | 1/2009 | Jin et al. |

(Continued)

FOREIGN PATENT DOCUMENTS

| CN | 105059058 A | 11/2015 |
| EP | 0739759 A2 | 10/1996 |

(Continued)

OTHER PUBLICATIONS

Communication dated Feb. 10, 2021, from the European Patent Office in application No. 18817826.3.
(Continued)

*Primary Examiner* — Matthew J Daniels
*Assistant Examiner* — Shibin Liang
(74) *Attorney, Agent, or Firm* — Sughrue Mion, PLLC

(57) ABSTRACT

Provided is a tire in which a tread half portion has a circumferential groove and land portions, an outline of a tread surface of the tread half portion includes circular arcs, the circular arc having a minimum radius of curvature is present within the outline of the land portion adjacent to a tread edge, the tread half portion has a base rubber layer, and a cap rubber layer, the base rubber layer has a lower storage modulus than the cap rubber layer, and an end of the layer in a tire width direction on a tread edge side is located in a region extending as much as 0.06 times a ground contact width of the tread half portion on each of both tire widthwise sides of a center of a tire widthwise length of an outline portion occupied by the circular arc having the minimum radius of curvature.

12 Claims, 6 Drawing Sheets

(52) U.S. Cl.
CPC ................ *B60C 2011/0344* (2013.01); *B60C 2011/0355* (2013.01)

(56) References Cited

U.S. PATENT DOCUMENTS

| | | | |
|---|---|---|---|
| 2010/0065174 A1* | 3/2010 | Matsunaga | B60C 11/0309 152/209.14 |
| 2011/0030862 A1 | 2/2011 | Hayashi et al. | |
| 2016/0229231 A1 | 8/2016 | Furusawa et al. | |
| 2017/0050469 A1* | 2/2017 | Hashimoto | B60C 11/00 |
| 2019/0039420 A1* | 2/2019 | Akashi | B60C 11/03 |

FOREIGN PATENT DOCUMENTS

| | | |
|---|---|---|
| EP | 2080642 A1 | 7/2009 |
| EP | 2781373 A1 | 9/2019 |
| JP | 09-071107 A | 3/1997 |
| JP | 1159128 A | 3/1999 |
| JP | 2004-050869 A | 2/2004 |
| JP | 2005-289315 A | 10/2005 |
| JP | 2004024473 A1 | 1/2006 |
| JP | 2006213205 A | 8/2006 |
| JP | 2007-331531 A | 12/2007 |
| JP | 2009-298397 A | 12/2009 |
| JP | 2012-121426 A | 6/2012 |
| JP | 4973020 B2 | 7/2012 |
| JP | 2015-058734 A | 3/2015 |
| JP | 5779703 B1 | 9/2015 |
| JP | 2017-013564 A | 1/2017 |
| JP | 2017087860 A | 5/2017 |
| WO | 2013108195 A1 | 7/2013 |

OTHER PUBLICATIONS

International Preliminary Report on Patentability with a Translation of Written Opinion in International English Application No. PCT/JP2018/018980, dated Dec. 17, 2019.
Search Report dated Apr. 2, 2021, from the China National Intellectual Property Administration in application No. 2018800384756.
International Search Report for PCT/JP2018/018980 dated Aug. 7, 2018 [PCT/ISA/210].
Written Opinion for PCT/JP2018/018980 dated Aug. 7, 2018 [PCT/ISA/237].
"Rubber Engineering", Indian Rubber Institute, Mar. 31, 2002, p. 115 (7 pages total).
Search Report dated Nov. 2, 2021 from the China National Intellectual Property Administration in CN Application No. 2018800384756.

* cited by examiner

A-A CROSS SECTION

TIRE

TECHNICAL FIELD

This disclosure relates to a tire, and more particularly to a tire having an excellent steering stability in a high-speed cornering situation.

BACKGROUND

Heretofore, as a technique to improve various performances of a tire, there has been performed a technique of providing a tread of the tire in a double structure of a cap rubber layer and a base rubber layer and providing a difference in hardness between the respective layers. For example, in a tire described in PTL 1, a hard rubber is disposed in a cap rubber layer of a structure including the cap rubber layer and a base rubber layer, so that a road noise performance is compatible with a steering stability.

CITATION LIST

Patent Literature

PTL 1: Japanese Patent Laid-Open No. 2004-50869

SUMMARY

Technical Problem

In recent years, high performances of a vehicle and a tire have advanced, and opportunities for traveling in a cornering situation of a high speed range have increased. As a result, improvement of a steering stability in the high-speed cornering situation is demanded. In the tire described in PTL 1, a high cornering power is achieved due to a high hardness of a cap rubber layer, but there is room for improvement of the steering stability especially at a high speed in the cornering situation.

To solve the problem, an object of the present disclosure is to provide a tire having an excellent steering stability especially at a high speed in a cornering situation.

Solution to Problem

The present inventor has investigated a solution to the above problem, and have obtained new findings as follows. That is, in a high-speed cornering situation of a vehicle, when tread half portions divided via a tire equatorial plane as a boundary are compared with each other, a ground contact pressure increases, and a footprint area also increases in the tread half portion that is an outside of a vehicle during installing in the vehicle. On the other hand, in the tread half portion that is an inside of the vehicle during the installing in the vehicle, a ground contact pressure is lower than that of the outside, and a tire footprint area also decreases. It becomes clear that such a difference in footprint area between the tread half portions divided via the tire equatorial plane as the boundary adversely affects the steering stability in the high-speed cornering situation of the vehicle.

To solve this problem, a way to improve a grounding property of the tread half portion disposed inside the vehicle during the installing in the vehicle is important.

Therefore, the present inventor has studied either one tread half portion from viewpoints of uniformizing of a ground contact pressure distribution and increase in footprint area. As a result, the present inventor has found that in addition to adoption of a double structure in which rubbers that are different in hardness are used in a cap rubber layer and a base rubber layer, defining of a tread surface outline shape of a tread half portion is effective for desired characteristic improvement, and has completed the present disclosure.

The present disclosure is summarized as follows.

A tire of the present disclosure is a tire comprising a carcass of a framework toroidally extending across a pair of bead cores, and comprising a belt and a tread in order on an outer side of the carcass in a tire radial direction, wherein a tread half portion on one side of the tread via a tire equatorial plane as a boundary has at least a circumferential groove and a plurality of land portions located on both sides of the groove, an outline of a tread surface of the tread half portion in tire widthwise cross-sectional view includes a plurality of circular arcs having different radii of curvatures, the circular arc having a minimum radius of curvature among the plurality of circular arcs is present within the outline of the land portion adjacent to a tread edge, the tread half portion has a base rubber layer, and a cap rubber layer laminated on an outer side of the base rubber layer in the tire radial direction, and the base rubber layer has a lower storage modulus than the cap rubber layer, and an end of the base rubber layer in a tire width direction on a tread edge side is located in a region extending as much as 0.06 times a ground contact width of the tread half portion on each of both tire widthwise sides of a center of a tire widthwise length of an outline portion occupied by the circular arc having the minimum radius of curvature.

Here, "the tread edge" in the present disclosure means a tire widthwise ground contact edge of the tire in a case where the tire mounted to an applicable rim is disposed vertically to a flat plate at a prescribed air pressure in a stationary state, and is loaded with a load corresponding to a prescribed mass. "The ground contact width" means a tire widthwise distance between the tread edges. Furthermore, it is considered that a surface region of a tread rubber between the tread edges is "the tread surface". Additionally, "the applicable rim" indicates a rim prescribed in an industrial standard effective in a district where the tire is produced and used, for example, JATMA (Japan Automobile Tyre Manufacturers Association) Year Book in Japan, ETRTO (European Tyre and Rim Technical Organization) Standard Manual in Europe, or TRA (The Tire and Rim Association Inc.) Year Book in U.S.

Furthermore, "the outline" is an outline of the tread surface in a tire widthwise cross section of the tire mounted to the applicable rim in a state where the tire is filled with a prescribed internal pressure and loaded with a prescribed load.

Furthermore, "the storage modulus" (E') in the present disclosure is measured at room temperature of 25° C., a frequency of 52 Hz, an initial strain rate of 2%, and a dynamic strain rate of 2% by use of a viscoelasticity meter.

Advantageous Effect

According to the present disclosure, there can be provided a tire having an excellent steering stability in a high-speed cornering situation.

DETAILED DESCRIPTION

[First Aspect]

Hereinafter, an embodiment of a tire of the present disclosure will be described in detail with reference to the drawings.

Figure 1:
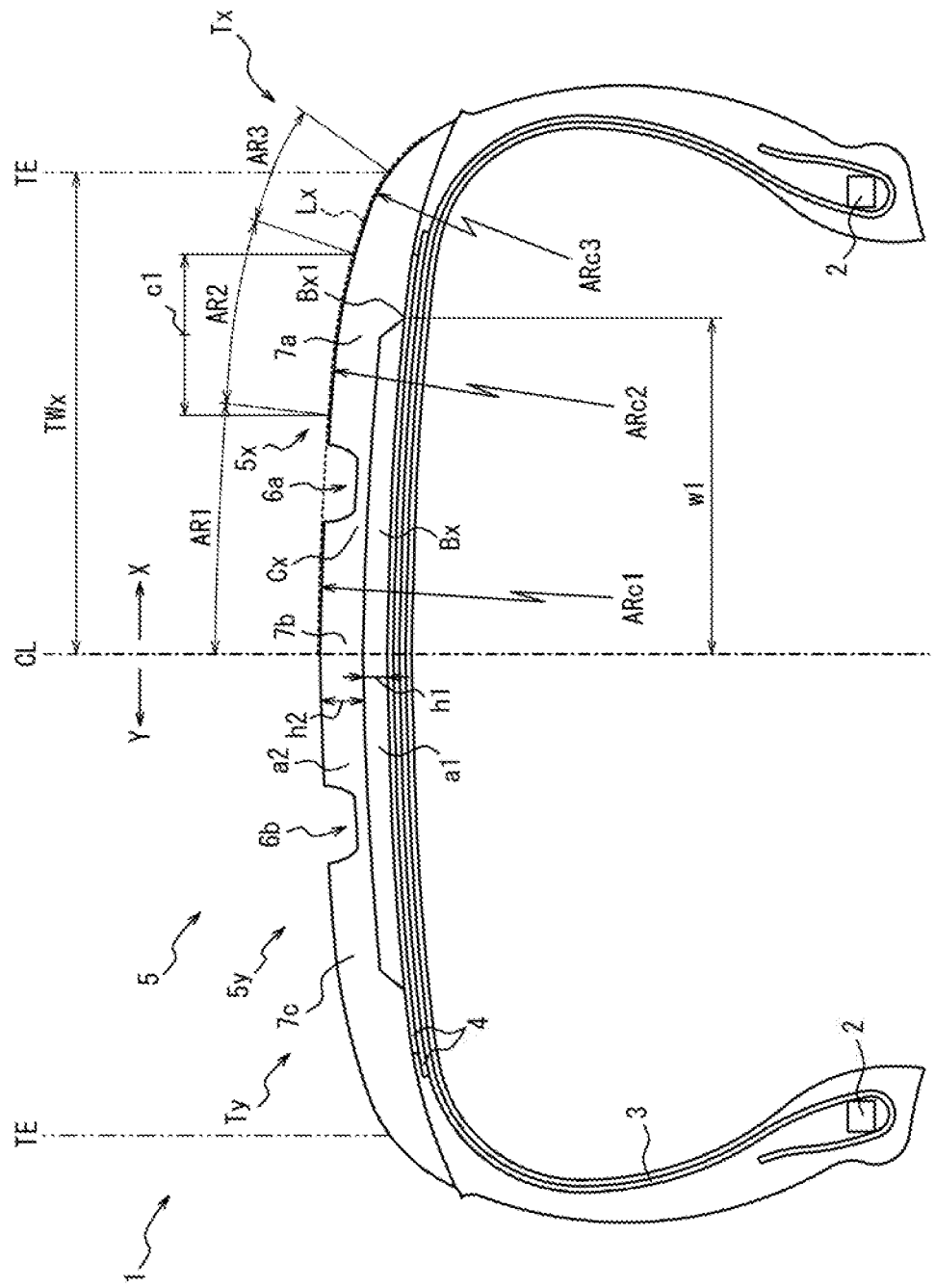
FIG. 1 is a cross-sectional view of a tire in a width direction according to one embodiment of the present disclosure.

FIG. 1 is a cross-sectional view of the tire in a width direction according to one embodiment of the present disclosure. The tire according to the present disclosure is a tire 1, as illustrated in the drawings, comprising a carcass 3 of a framework toroidally extending across a pair of bead cores 2, and comprising two layers of belts 4 and a tread 5 in order on an outer side of the carcass 3 in a tire radial direction. Furthermore, a tread surface of the tread (hereinafter referred to as the tread surface) is a surface region between tread edges TE of the tread 5 in the illustrated example.

The tire according to the present disclosure specifies a structure of a tread half portion on one side of the tread via a tire equatorial plane as a boundary. The tire in which the tread half portion having this specified structure is to be disposed inside a vehicle is installed in the vehicle for use. That is, a structure of a tread half portion on the other side does not have to be especially limited, and may have a structure similar to or different from the one side.

Hereinafter, a structure of a tread half portion $5x$ on the one side will be described in detail. First, the tread half portion $5x$ has at least a circumferential groove and a plurality of land portions located on both sides of the groove. In the tire 1 illustrated in FIG. 1, the tread half portion $5x$ has a circumferential groove $6a$, the plurality of land portions located on both sides of the groove, a tread edge side land portion $7a$, and an equator side land portion $7b$.

In the tire according to the present disclosure, it is essential that an outline Lx of a tread surface of the tread half portion $5x$ in tire widthwise cross-sectional view includes a plurality of circular arcs having different radii of curvatures and that the circular arc having a minimum radius of curvature among the plurality of circular arcs is present within the outline of the land portion adjacent to a tread edge.

That is, the outline Lx includes three circular arcs AR1, AR2 and AR3, and has the circular arcs AR1, AR2 and AR3 having different radii of curvatures ARc1, ARc2 and ARc3. Here, it is essential that the circular arc AR2 having a minimum radius of curvature ARc2 among the radii of curvatures ARc1, ARc2 and ARc3 is present within the outline of the tread edge side land portion $7a$.

As described above, in a high-speed cornering situation of the vehicle, a ground contact pressure of the tread surface of the vehicle-installed inside tread half portion $5x$ is lower than an outside ground contact pressure. In particular, the tread edge side land portion $7a$ of the tread half portion $5x$ has a poor grounding property. To solve the problem, the tread edge side land portion $7a$ is given an outline following the circular arc AR2 having the minimum radius of curvature ARc2 in the tread half portion $5x$, so that the ground contact pressure increases in the tread edge side land portion $7a$ that protrudes outward in the radial direction. As a result, the grounding property of the whole tread half portion $5x$ improves.

Note that in the illustrated example, the radii of curvatures ARc1, ARc2 and ARc3 of the three circular arcs AR1, AR2 and AR3 have a magnitude relation of ARc1>ARc3>ARc2. Note that there are not any restrictions on of the radii of curvatures ARc1, ARc2 and ARc3 as long as the circular arc having the minimum radius of curvature is located in the tread edge side land portion $7a$, and the radii of curvatures may have another magnitude relation.

Furthermore, the tread half portion $5x$ has a laminate structure of a base rubber layer Bx, and a cap rubber layer Cx laminated on an outer side of the base rubber layer Bx in the tire radial direction. The base rubber layer Bx has a lower storage modulus than the cap rubber layer Cx. The base rubber layer Bx extends from a tire equatorial plane CL to a tread edge TE side, and an end Bx1 in the tire width direction on the tread edge TE side is located in a region of 0.06 times a ground contact width TWx of the tread half portion $5x$ on each of both tire widthwise sides of a center c1 of a tire widthwise length of an outline portion occupied by the circular arc AR2 having the minimum radius of curvature. In the illustrated example, the end is located in a region of 0.06 times the ground contact width TWx from the center c1 on the tread edge TE side and 0.06 times the ground contact width TWx from the center on an equatorial plane CL side.

Note that the center c1 of the circular arc AR indicates a point on the circular arc that corresponds to a central position of a tire widthwise distance between both ends of the circular arc AR in the tire width direction. Furthermore, the end Bx1 of the base rubber layer Bx in the tire width direction of the tread edge TE is a position of the base rubber layer Bx that is closest to the tread edge TE side in the tire width direction.

Hereinafter, description will be made as to the above configuration in detail with reference to FIG. 2 to FIG. 4.

Figure 2A:
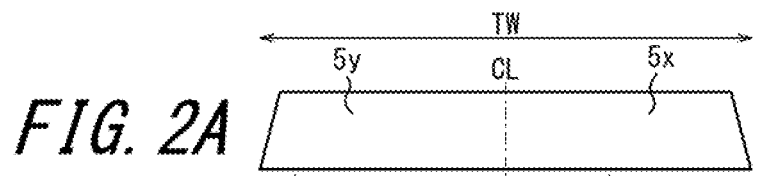
FIG. 2A is a schematic view illustrating one example of a tread of the tire and FIG. 2B is a schematic view illustrating one example of a ground contact state of the tire.

First, a tread of a tire illustrated in FIG. 2A does not have a laminate structure of a cap rubber layer and a base rubber layer, and has a uniform rubber hardness. Furthermore, an outline of a tread surface also has a circular arc with a uniform curvature. At this time, as illustrated in a ground contact state of FIG. 2B, a ground contact pressure increases in a vehicle-installed outside tread half portion $5y$ in a high-speed cornering situation of the vehicle. A ground contact length in a tire circumferential direction increases toward the outside tread edge TE, and reaches an upper limit at the tread edge TE. On the other hand, the vehicle-installed inside tread half portion $5x$ has a lower ground contact pressure of the tread surface and also has a smaller footprint area in the tire width direction and a circumferential direction than the outside tread half portion $5y$.

Figure 3A:
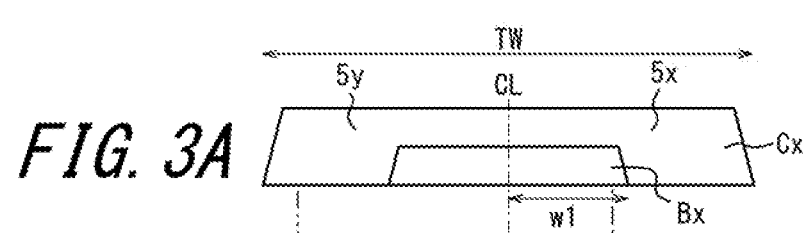
FIG. 3A is a schematic view illustrating another example of the tread of the tire and FIG. 3B is a schematic view illustrating another example of the ground contact state of the tire.

Next, a tread of a tire illustrated in FIG. 3A has a laminate structure of a base rubber layer Bx, and a cap rubber layer Cx laminated on an outer side of the base rubber layer Bx in a tire radial direction, and the base rubber layer Bx has a lower storage modulus than the cap rubber layer Cx.

Figure 2B:
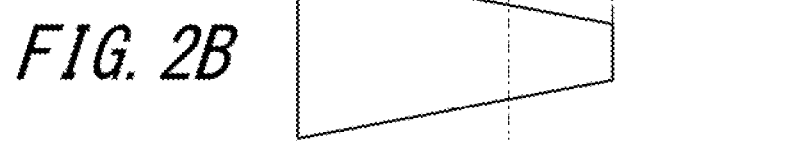
Figure 3B:

At this time, as illustrated in a ground contact state of FIG. 3B, in a tread half portion 5x, a footprint area in the high-speed cornering situation of the vehicle increases as compared with FIG. 2B. That is, decrease in the storage modulus of the base rubber layer Bx leads to decrease in rigidity of the tread, and permits radial growth during rolling of the tire. In particular, the vehicle-installed inside tread half portion 5x has a lower ground contact pressure of a tread surface than the outside tread half portion 5y, so that the above described radial growth is remarkably seen in the tread half portion 5x. As a result, the footprint area in the tread half portion 5x increases.

Furthermore, due to the decrease in the storage modulus of the base rubber layer Bx, deformation of the cap rubber layer Cx easily escapes to a base rubber layer Bx side on an inner side in the tire radial direction. Consequently, the cap rubber layer Cx follows unevenness of a road surface to be deformed during rolling of the tire due to a load, and improvement of a grounding property can be further promoted.

Figure 4A:
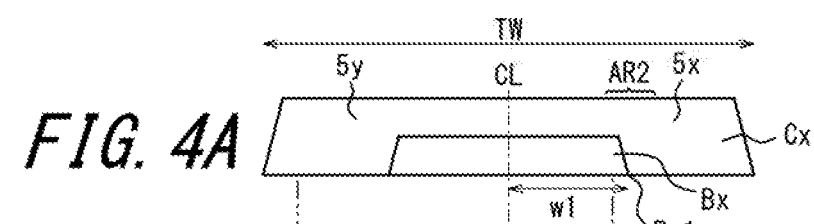
FIG. 4A is a schematic view illustrating still another example of the tread of the tire and FIG. 4B is a schematic view illustrating still another example of the ground contact state of the tire.
Figure 4B:

Next, in a structure similar to that of FIG. 3A, a tread of a tire illustrated in FIG. 4A has a tread structure in which prescription concerning an outline of a circular arc AR2 is given at a position of a tire widthwise end Bx1 of a base rubber layer Bx in an outline of a tread surface. Specifically, the tire has the tread according to the present disclosure, and has a laminate structure of a base rubber layer Bx, and a cap rubber layer Cx laminated in a tire radial direction of the base rubber layer Bx. Furthermore, the end Bx1 in the tire width direction on a tread edge TE side is located in a region extending as much as 0.06 times a ground contact width TWx of a tread half portion 5x on each of both tire widthwise sides of a center c1 of a tire widthwise length of an outline portion occupied by the circular arc AR2 having a minimum radius of curvature. At this time, as illustrated in a ground contact state of FIG. 4B, a footprint area of the tread half portion 5x in a cornering situation of a vehicle further increases as compared with FIG. 2B and FIG. 3B.

As described above, the circular arc AR2 having the minimum radius of curvature contributes to the improvement of the grounding property of the tread edge side land portion 7a. Here, if the tire widthwise length of the shoulder side land portion 7a is larger than that of the equator side land portion 7b and if the land portion is bulged in a tire circumferential direction and width direction due to inward compressive deformation of the circular arc AR2 in the tire radial direction, it is difficult to allow the bulging to escape out of the land portion. As a result, a compression rigidity of a circular arc AR2 portion excessively increases, and the above described effect of improving the grounding property may be inhibited. To solve the problem, in the present embodiment, the end Bx1 of the base rubber layer Bx having the low storage modulus in the tire width direction is disposed in a predetermined range from the center c1 of the tire widthwise length of the circular arc AR2 on each of both tire widthwise sides of the center. According to this configuration, the compressive deformation of the circular arc AR2 portion is relaxed and the compression rigidity decreases. Therefore, the effect of improving the grounding property of the shoulder side land portion 7a can be sufficiently obtained. Consequently, increase in footprint area of the tread half portion 5x can be attempted.

Note that a configuration and storage modulus of a tread rubber of the vehicle-installed outside tread half portion 5y can be arbitrarily set. However, if a ratio of the base rubber layer having a lower storage modulus than the cap rubber layer is large, the rigidity of the tread may decrease.

Furthermore, the increase in footprint area of the tread half portion 5x leads to a small difference from the footprint area of the tread half portion 5y, and hence uneven wear of the tread surface can be inhibited.

Preferably, a position of the end Bx1 of the base rubber layer Bx in the tire width direction is a region extending as much as 0.05 times the ground contact width TWx of the tread half portion 5x on each of both tire widthwise sides of the center c1 of the tire widthwise length of an outline portion occupied by the circular arc AR2. According to this configuration, the grounding property in the high-speed cornering situation can more effectively improve.

Note that it is preferable that the end Bx1 of the base rubber layer Bx in the tire width direction is present at a position where a tire widthwise distance from the tire equatorial plane CL is 0.7 times or more and 1.0 time or less the ground contact width TWx of the tread half portion 5x. According to this configuration, the ground contact length of the tread can be increased while maintaining the rigidity of the tread.

Furthermore, in the present disclosure, it is preferable that a tire widthwise length w1 of the base rubber layer Bx is from 70% to 100% of the tire widthwise length of the ground contact width TWx of the tread half portion 5x. A ratio of the base rubber layer Bx having the low storage modulus in the ground contact width TWx can be sufficiently acquired, and the grounding property can securely improve.

Note that the tire widthwise length w1 of the base rubber layer is measured by the following procedure. First, the tire is cut at three locations every 120 degrees in the tire width direction. Subsequently, in each of cross sections at the three locations in the tire width direction, a maximum length of the base rubber layer Bx in the tire width direction is measured, and an average value of measurements at the three locations is calculated, thereby obtaining the tire widthwise length w1 of the base rubber layer Bx.

The tire widthwise length w1 of the base rubber layer Bx is more preferably from 75% to 95% and further preferably from 76% to 82% of the tire widthwise length of the ground contact width TWx of the tread half portion 5x. According to this configuration, the grounding property can more effectively improve.

Note that the base rubber layer possesses a nearly trapezoidal shape in the tire widthwise cross-sectional view of FIG. 1, but may have another shape such as a nearly rectangular shape or a nearly elliptic shape.

Furthermore, in the present disclosure, it is preferable that a storage modulus E'1 of the cap rubber layer Cx is 1.05 times or more and 4.4 times or less a storage modulus E'2 of the base rubber layer Bx. According to this configuration, balance between the grounding property and the rigidity in the tread can be effectively acquired.

The storage modulus E'1 of the cap rubber layer Cx is preferably 1.7 times or more and 3.5 times or less and more preferably from 2.2 times or more and 2.7 times or less the storage modulus E'2 of the base rubber layer Bx. According to this configuration, the balance between the grounding property and the rigidity in the tread half portion 5x can be more effectively acquired.

Furthermore, in the tire 1 of the present disclosure, it is also preferable that the storage modulus E'1 of the cap rubber layer Cx is 7.5 MPa or more and 12.0 MPa or less and that the storage modulus E'2 of the base rubber layer Bx is 3.0 MPa or more and 7.0 MPa or less, to optimize the balance between the grounding property and the rigidity in the tread half portion 5x.

Furthermore, in the present disclosure, it is preferable that an area a1 of the base rubber layer Bx in a tire widthwise cross section is 8% or more and 15% or less of a total of the area a1 and an area a2 of the cap rubber layer Cx in the tire widthwise cross section. When the area is 8% or more of the total, a ratio of the base rubber layer Bx having the low storage modulus in a total area of the cap rubber layer Cx and the base rubber layer Bx can be sufficiently acquired, and the grounding property can securely improve. Furthermore, when the area is 15% or less of the total, decrease in rigidity of the whole tread half portion 5x can be prevented.

Note that areas of the base rubber layer Bx and the cap rubber layer Cx in the tire widthwise cross section are measured by the following procedure. First, the tire is cut at three locations every 120 degrees in the tire width direction. Subsequently, in each of tire widthwise cross sections at the three locations, each of the areas of the base rubber layer and the cap rubber layer is measured, and an average value of measurements at the three locations is calculated, thereby obtaining the area of the base rubber layer Bx in the tire widthwise cross section and the area of the cap rubber layer Cx in the tire widthwise cross section.

Furthermore, in the present disclosure, it is preferable that a length h1 of the base rubber layer Bx in the tire radial direction is 12% or more and 25% or less of a length h2 of the cap rubber layer Cx in the tire radial direction in the tire widthwise cross section. According to the above configuration, balance between the cap rubber layer Cx of the tire in direct contact with the road surface and the base rubber layer Bx having the low storage modulus can be taken. Consequently, it is possible to improve the grounding property while acquiring the rigidity of the tread.

Note that the length h1 of the base rubber layer Bx in the tire radial direction and the length h2 of the cap rubber layer Cx in the tire radial direction in the tire widthwise cross section are values obtained by cutting the tire at three locations every 120 degrees in the tire width direction, measuring a maximum widthwise length and area of each of the base rubber layer Bx and the cap rubber layer Cx at the three locations in the tire widthwise cross section, dividing the area by the maximum widthwise length, and calculating an average value of measurements at the three locations.

Note that in the present embodiment, the tread half portion 5y on a Y-side that is the other side of the tread 5 via the tire equatorial plane CL as the boundary is a structure that is line symmetrical with the tread half portion 5x via the equatorial plane CL as the boundary in the illustrated example. The tread half portion 5y has one circumferential groove 6b, a plurality of land portions located on both sides of the groove, an equator side land portion 7b, and a tread edge side land portion 7c.

That is, in the illustrated example, the tread half portion 5y possesses a tire widthwise cross section similar to that of the tread half portion 5x, but may possess a different tire widthwise cross section.

Figure 5:
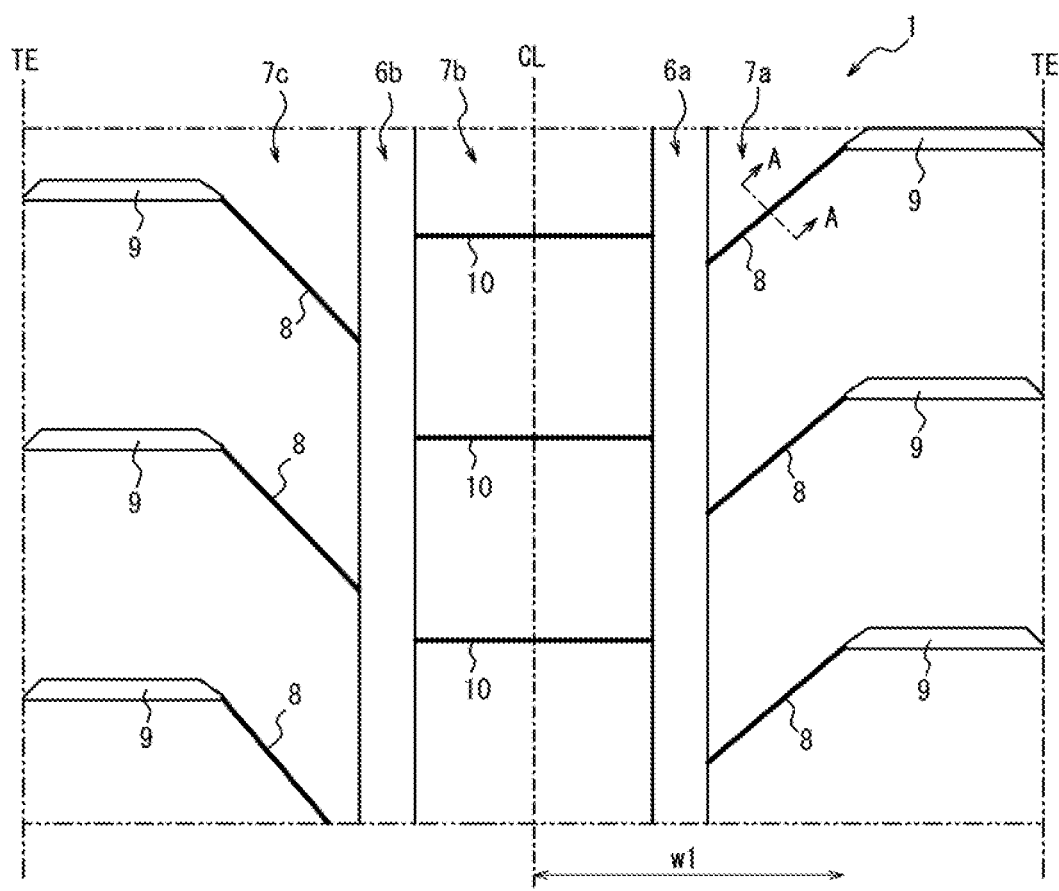
FIG. 5 is a developed view illustrating a tread surface of a tire according to another embodiment of the present disclosure.

Furthermore, the tire according to the present disclosure can comprise a pattern illustrated in FIG. 5.

FIG. 5 is a developed view illustrating a tread surface of a tire according to another embodiment of the present disclosure. In an illustrated example, a plurality of land portions defined by two circumferential grooves 6a and 6b extending along a tire equatorial plane CL and tread edges TE, tread edge side land portions 7a and 7c and an equator side land portion 7b are formed in the tread surface.

Here, it is preferable that the tire of the present disclosure has a sipe extending in a tire width direction and bent in a tire radial direction in a tread surface of the tread that is located on an outer side of a base rubber layer Bx in the tire radial direction. As illustrated in FIG. 5, each of the tread edge side land portions 7a and 7c adjacent to the tread edges TE includes a sipe 8 that has one end opened in the circumferential groove 6a or 6b and the other end extending on a tread edge TE side and that terminates in the tread edge side land portion 7a or 7c. In the tread edge side land portions 7a and 7c, the sipes 8 are equally spaced and arranged in a tread circumferential direction.

Note that the sipe 8 referred to in the present disclosure is a cut having a width of 0.1 to 0.4 mm to such an extent that at least parts of a groove wall of the sipe come in contact with each other during ground contact of the tread surface.

Figure 6:
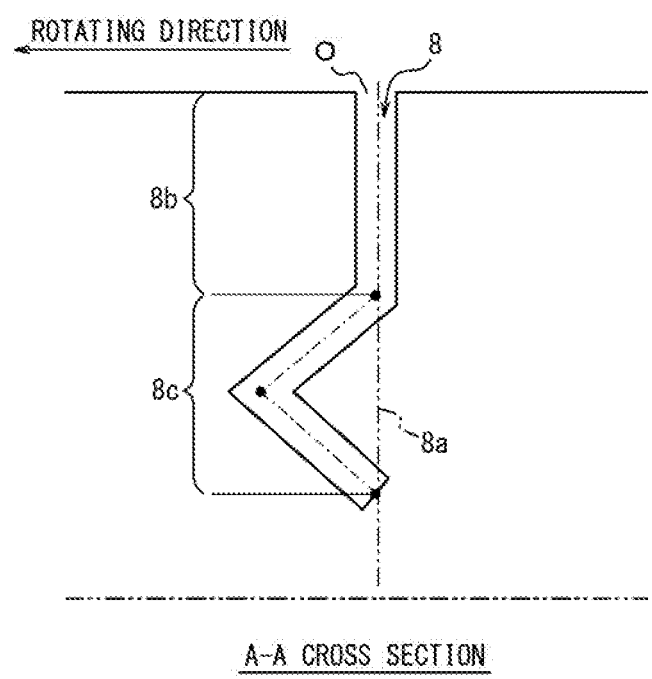
FIG. 6 is a cross-sectional view taken along the A-A line of FIG. 5.

FIG. 6 illustrates a cross-sectional view of the sipe 8 taken along the A-A line of FIG. 5. As illustrated in the drawing, the sipe 8 has a surface extending from an opening O of the sipe in the tread surface of the tire along an opening shape in the tire radial direction as a reference surface 8a, and has a shape including an extending portion 8b following the opening shape from the opening O along the reference surface 8a and extending along the reference surface 8a in the tire radial direction, and a protruding portion 8c protruding from the reference surface 8a in the tire circumferential direction and again returning to the reference surface 8a via a bend.

According to this configuration, while acquiring a drainage performance during straight running, partial decrease in rigidity of the land portion in the high-speed cornering situation of the vehicle is inhibited. Consequently, a turning performance can improve. That is, in the high-speed cornering situation, a lateral force is generated in the tire in accordance with a traveling speed of the vehicle and a degree of the cornering situation. When the sipe 8 is present in a ground contact region, side walls defining the sipe easily come away from each other, and hence rigidity of the corresponding land portion decreases. To solve the problem, the protruding portion 8c is provided in an intermediate region of the sipe in a depth direction as described above, whereby a shape that resists input of the lateral force is given to the sipe. Note that the protruding portion 8c is provided via the extending portion 8b on an opening side for the following reason. That is, in a case where the protruding portion 8c is formed from the opening O, an acute angle portion is formed in the opening, thereby causing decrease in rigidity around the opening. Furthermore, rubber chip off from the acute angle portion may occur. To solve the problem, the sipe is formed in a shape radially extending at a constant depth from the tread surface in the radial direction, so that the above disadvantage can be avoided.

Furthermore, as illustrated in the drawing, each of the tread edge side land portions 7a and 7c has a lateral groove 9 extending from the tread edge TE to an equatorial plane CL side and communicating with the sipe 8, so that the drainage performance can improve. Here, the lateral groove 9 referred to in the present disclosure is a groove having an opening width in excess of a width of the sipe. Note that in the present disclosure, it is essential that a cap rubber layer Cx only extends and the base rubber layer Bx does not extend on an inner side of the tread half portion 5x in the tire radial direction of the tread surface in which the lateral groove 9 extends.

According to the above configuration, the base rubber layer Bx having the low storage modulus is not present together with the lateral groove in the tire radial direction. Consequently, the rigidity of the tread is acquired while the grounding property improves, and the steering stability in the high-speed cornering situation can effectively improve. Furthermore, the rigidity can be uniformed, and hence uneven wear resistance can also improve.

Furthermore, as illustrated in the drawing, the equator side land portion 7b can have sipes 10 extending in the tire width direction and equally spaced and arranged in a tire circumferential direction.

[Second Aspect]

Figure 7:
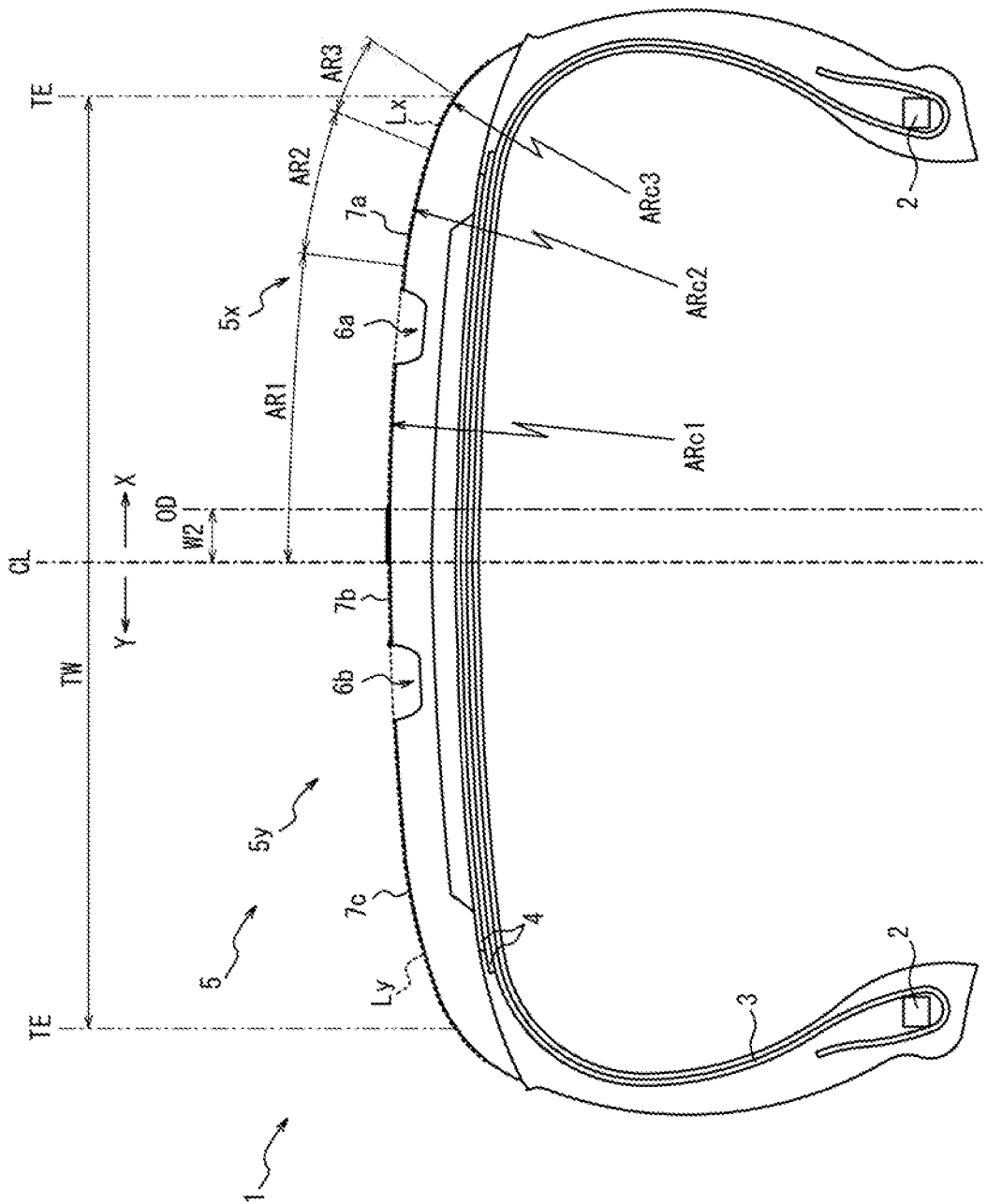
FIG. 7 is a developed view illustrating a tread surface of a tire according to still another embodiment of the present disclosure.
Figure 8:
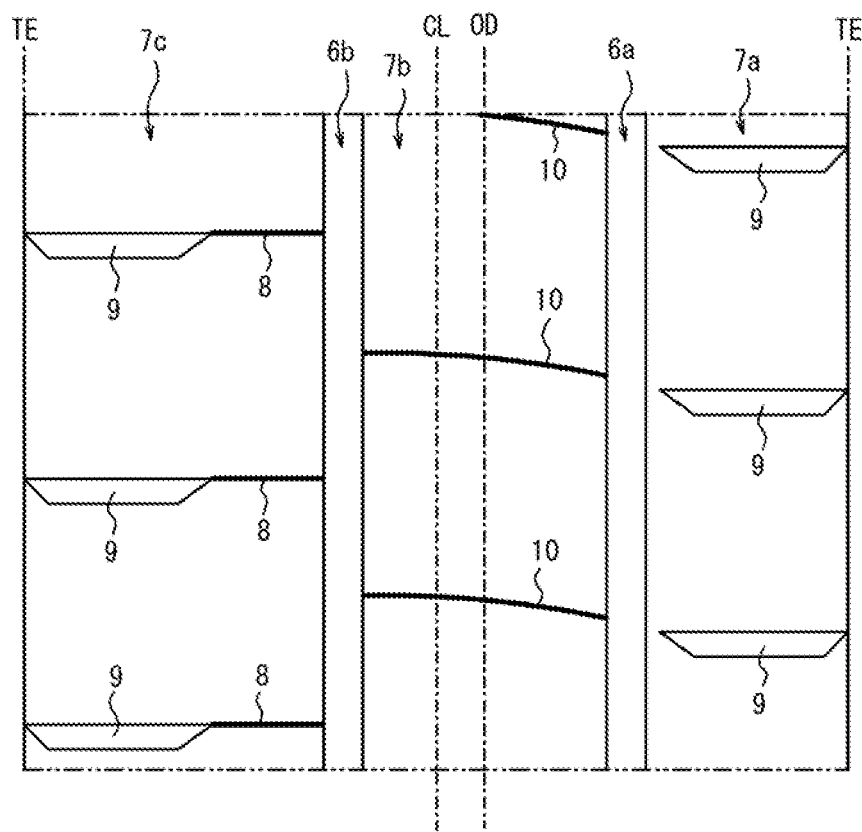
FIG. 8 is a developed view illustrating the tread surface of the tire according to the embodiment of the present disclosure.

FIG. 7 is a developed view illustrating a tread surface of a tire according to another embodiment of the present disclosure, and FIG. 8 is a developed view illustrating the tread surface of the tire according to the embodiment of the present disclosure. Note that in FIG. 7 and FIG. 8, components similar to those in FIG. 1 and FIG. 5 are denoted with the same reference signs and description thereof is omitted.

The tire illustrated in FIG. 7 and FIG. 8 has a right-left asymmetrical shape via a tire equatorial plane CL as a boundary. A land portion 7a has a minimum tire widthwise length, and a land portion 7c has a maximum tire widthwise length.

Furthermore, in a usual tire, an equator matches a maximum outer diameter position. On the other hand, in the present disclosure, it is preferable that a tire maximum outer diameter position OD is present on a tread edge TE side of the tire equatorial plane CL. In an illustrated example, the tire maximum outer diameter position OD is disposed close to the tread edge TE on an X-side via the equator CL as a boundary. That is, a ground contact length of the tire is usually largest at a maximum radial position. Consequently, the position is disposed to more effectively acquire a footprint area in a tread half portion 5x on an inner side of the equator CL in a tire installing direction.

In the present disclosure, it is preferable that a tire widthwise distance w2 from a position of the tire equatorial plane CL to the tire maximum outer diameter position OD is a length of 5% to 15% or less of a ground contact width TW of the tire. This is because when the length is less than 5%, an effect of enlarging the footprint area on the inner side in the tire installing direction is not sufficiently acquired, and when the length is in excess of 15%, a grounding property on the inner side in the tire installing direction is impaired.

Furthermore, as illustrated in FIG. 8, the tread edge side land portion 7c has a plurality of sipes 8 spaced in a tread circumferential direction. In an illustrated example, each sipe 8 is a groove that has one end opened in a circumferential groove 6b and the other end extending on a tread edge TE side, terminates in the tread edge side land portion 7c, and has a small opening width. In the tread edge side land portion 7c, the sipes 8 are equally spaced and arranged in the tread circumferential direction.

The sipe 8 has a configuration similar to the sipe 8 illustrated in FIG. 6. During traveling along a wet road surface, the sipe repeatedly contains water that is present in a ground contact region of the tread and discharges this water out of the ground contact region, thereby promoting a drainage performance of the tire.

Furthermore, as illustrated in the drawing, an equator side land portion 7b has sipes 10, so that the drainage performance of the tire can improve.

Additionally, the tread edge side land portions 7a and 7c have lateral grooves 9. At this time, it is essential that a cap rubber layer Cx only extends and a base rubber layer Bx does not extend on an inner side in a tire radial direction of the tread surface in which the lateral groove 9 extends.

EXAMPLES

Hereinafter, description will be made as to examples of the present disclosure, but the present disclosure is not limited to the examples only.

Sample tires 1 to 13 (each having a size of 205/55R16) would be made on an experimental basis under specifications illustrated in Table 1-1 and Table 1-2, and a steering stability and an uneven wear resistance performance would be evaluated.

(Sensory Assessment of Steering Stability)

Each sample tire would be attached to a rim having a size of 7.0 J, provided (charged) with an internal pressure of 240 kPa, and then installed in a rear-wheel-drive vehicle having a displacement of 2000 cc. The vehicle would travel along a test course in a state where one driver would be in the vehicle. Consequently, the steering stability would be evaluated.

The result would be displayed in indices while total grip and steering feeling of the sample tire 1 would be set to 100. Note that a larger index indicates an excellent performance.

(Uneven Wear Resistance Evaluation)

Each sample tire would be attached to the rim having the size of 7.0 J, provided (charged) with the internal pressure of 240 kPa, and then installed in the rear-wheel-drive vehicle having the displacement of 2000 cc. The vehicle would travel along a test course in a state where one driver would be in the vehicle. Thereafter, a difference in wear amount would be measured between a portion having a maximum wear amount and a portion having a minimum wear amount, and uneven wear resistance would be evaluated. The result would be displayed in indices while the sample tire 1 would be set to 100. Note that a larger index indicates an excellent uneven wear resistance performance.

TABLE 1-1

| | Sample tire 1 | Sample tire 2 | Sample tire 3 | Sample tire 4 | Sample tire 5 | Sample tire 6 | Sample tire 7 |
|---|---|---|---|---|---|---|---|
| Tread pattern | — | FIG. 5 | FIG. 5 | FIG. 5 | FIG. 5 | FIG. 8 | FIG. 5 |
| Structure of tread rubber | 1 layer | 2 layers | 2 layers | 2 layers | 2 layers | 2 layers | 2 layers |
| Land portion where circular arc having minimum radius of curvature is located | Equator side land portion | Tread edge side land portion | Tread edge side land portion | Tread edge side land portion | Tread edge side land portion | Tread edge side land portion | Tread edge side land portion |
| Storage modulus E'1 (MPa) of cap rubber layer | 9 | 9 | 9 | 9 | 9 | 9 | 9 |
| Storage modulus E'2 (MPa) of base rubber layer | — | 3.4 | 3.4 | 3.4 | 3.4 | 3.4 | 3.4 |
| Position of base rubber layer end Bx1 (*1) | — | 0.10 TWx (CL side) | 0.10 TWx (TE side) | 0.06 TWx | 0.05 TWx | 0.05 TWx | 0.05 TWx |

TABLE 1-1-continued

|  | Sample tire 1 | Sample tire 2 | Sample tire 3 | Sample tire 4 | Sample tire 5 | Sample tire 6 | Sample tire 7 |
|---|---|---|---|---|---|---|---|
| Tire ground contact width TWx of tread half portion 5x | 75 | 75 | 75 | 75 | 75 | 75 | 75 |
| Tire widthwise length w1 of base rubber layer Bx | — | 71 | 71 | 71 | 71 | 71 | 71 |
| Presence of sipe | None | Present | Present | Present | Present | Present | Present |
| Shape of sipe | — | Bent Present | Bent Present | Bent Present | Bent Present | Bent Present | Bent Present |
| Presence of lateral groove | Present | Present | Present | Present | Present | Present | Present |
| Position of lateral groove (*2) | — | Outside of base | Outside of base | Outside of base | Outside of base | Outside of base | Inside of base |
| Tire widthwise distance w2 (mm) from position of equatorial plane CL to tire maximum outer diameter position OD | 0 | 0 | 0 | 0 | 0 | 5 | 0 |
| Steering stability | 100 | 145 | 140 | 155 | 165 | 180 | 155 |
| Wear resistance performance/uneven wear resistance performance | 100 | 105 | 95 | 110 | 115 | 115 | 105 |
| Remarks | Comparative example | Comparative example | Comparative example | Disclosure example | Disclosure example | Disclosure example | Disclosure example |

(*1) In a case where the position of the base rubber layer end Bx1 of the sample tire is located on an equatorial plane CL side of c1, "CL side" is described, and in a case where the position is located on a tread edge TE side of c1, "TE side" is described.
(*2) In a case where the lateral groove is present at a position where the groove is present together with the base rubber layer in a tire radial direction, "inside of base" is described.
In a case where the lateral groove is present at a position where the groove is not present together with the base rubber layer in the tire radial direction, "outside of base" is described.

TABLE 1-2

|  | Sample tire 8 | Sample tire 9 | Sample tire 10 | Sample tire 11 | Sample tire 12 | Sample tire 13 |
|---|---|---|---|---|---|---|
| Tread pattern | FIG. 5 | FIG. 5 | FIG. 5 | FIG. 5 | FIG. 5 | FIG. 5 |
| Structure of tread rubber | 2 layers | 2 layers | 2 layers | 2 layers | 2 layers | 2 layers |
| Land portion where circular arc having minimum radius of curvature is located | Tread edge side land portion | Tread edge side land portion | Tread edge side land portion | Tread edge side land portion | Tread edge side land portion | Tread edge side land portion |
| Storage modulus E'1 (MPa) of cap rubber layer | 9 | 7 | 13 | 12 | 9 | 7.5 |
| Storage modulus E'2 (MPa) of base rubber layer | 3.4 | 3.4 | 3.4 | 2.5 | 8 | 12 |
| Position of base rubber layer end Bx1 (*1) | 0.05 TWx | 0.10 TWx (CL side) | 0.10 TWx (CL side) | 0.10 TWx (CL side) | 0.10 TWx (CL side) | 0.05 TWx |
| Tire ground contact width TWx of tread half portion 5x | 75 | 75 | 75 | 75 | 75 | 75 |
| Tire widthwise length w1 of base rubber layer Bx | 71 | 71 | 71 | 71 | 71 | 71 |
| Presence of sipe | Present | Present | Present | Present | Present | Present |
| Shape of sipe | Bent None | Bent Present | Bent Present | Bent Present | Bent Present | Bent Present |
| Presence of lateral groove | Present | Present | Present | Present | Present | Present |
| Position of lateral groove (*2) | Outside of base | Outside of base | Outside of base | Outside of base | Outside of base | Outside of base |
| Tire widthwise distance w2 (mm) from position of equatorial plane CL to tire maximum outer diameter position OD | 0 | 0 | 0 | 0 | 0 | 0 |
| Steering stability | 150 | 115 | 105 | 105 | 145 | 140 |
| Wear resistance performance/uneven wear resistance performance | 110 | 80 | 115 | 100 | 105 | 95 |
| Remarks | Disclosure example | Comparative example | Comparative example | Comparative example | Comparative example | Comparative example |

(*1) In the case where the position of the base rubber layer end Bx1 of the sample tire is located on the equatorial plane CL side of c1, "CL side" is described, and in the case where the position is located on the tread edge TE side of c1, "TE side" is described.
(*2) In the case where the lateral groove is present at the position where the groove is present together with the base rubber layer in the tire radial direction, "inside of base" is described.
In the case where the lateral groove is present at the position where the groove is not present together with the base rubber layer in the tire radial direction, "outside of base" is described.

REFERENCE SIGNS LIST 1 tire
2 bead core
3 carcass
4 belt
5x and 5y tread half portion
6a and 6b tread surface
7a and 7c tread edge side land portion
7b equator side land portion
8 sipe
9 lateral groove
10 sipe

The invention claimed is:

1. A tire comprising a carcass of a framework toroidally extending across a pair of bead cores, and comprising a belt, a sipe and a tread in order on an outer side of the carcass in a tire radial direction, wherein a tread half portion on one side of the tread via a tire equatorial plane as a boundary has at least a circumferential groove and a plurality of land portions located on both sides of the groove, an outline of a tread surface of the tread half portion in tire widthwise cross-sectional view includes a plurality of circular arcs having different radii of curvatures, and the circular arc having a minimum radius of curvature among the plurality of circular arcs is present within the outline of the land portion adjacent to a tread edge, the tread half portion has a base rubber layer, and a cap rubber layer laminated on an outer side of the base rubber layer in the tire radial direction, the base rubber layer has a lower storage modulus than the cap rubber layer, and an end of the base rubber layer in a tire width direction on a tread edge side is located in a region extending as much as 0.06 times a ground contact width of the tread half portion on each of both tire widthwise sides of a center of a tire widthwise length of an outline portion occupied by the circular arc having the minimum radius of curvature, the sipe extending in the tire width direction and bent in the tire radial direction in the tread surface located on the outer side of the base rubber layer in the tire radial direction, the land portion adjacent to the tread edge has a lateral groove extending from the tread edge to a tire equatorial plane side and communicating with the sipe, and the cap rubber layer only extends and the base rubber layer does not extend on an inner side of the tread half portion in the tire radial direction of the tread surface in which the lateral groove extends.

2. The tire according to claim 1, wherein a tire maximum outer diameter position of the tread surface is present on the tread edge side of a tire equator.

3. The tire according to claim 1, wherein the storage modulus of the cap rubber layer is 1.05 times or more and 4.40 times or less the storage modulus of the base rubber layer.

4. The tire according to claim 3, wherein the storage modulus of the cap rubber layer is 7.5 MPa or more and 12.0 MPa or less, and the storage modulus of the base rubber layer is 3.0 MPa or more and 7.0 MPa or less.

5. The tire according to claim 3, wherein a tire maximum outer diameter position of the tread surface is present on the tread edge side of a tire equator.

6. The tire according to claim 3, wherein a tire maximum outer diameter position of the tread surface is present on the tread edge side of a tire equator.

7. The tire according to claim 4, comprising a sipe extending in the tire width direction and bent in the tire radial direction in the tread surface located on the outer side of the base rubber layer in the tire radial direction.

8. The tire according to claim 4, wherein a tire maximum outer diameter position of the tread surface is present on the tread edge side of a tire equator.

9. The tire according to claim 7, wherein a tire maximum outer diameter position of the tread surface is present on the tread edge side of a tire equator.

10. The tire according to claim 1, wherein the storage modulus of the cap rubber layer is 7.5 MPa or more and 12.0 MPa or less, and the storage modulus of the base rubber layer is 3.0 MPa or more and 7.0 MPa or less.

11. The tire according to claim 10, wherein a tire maximum outer diameter position of the tread surface is present on the tread edge side of a tire equator.

12. The tire according to claim 10, wherein a tire maximum outer diameter position of the tread surface is present on the tread edge side of a tire equator.

* * * * *